United States Patent [19]

Voyles et al.

[11] 3,971,970
[45] July 27, 1976

[54] ELECTRICAL COMPONENT WITH LOW IMPEDANCE AT HIGH FREQUENCY

[75] Inventors: Gerald A. Voyles; Edward M. Moss, both of Indianapolis, Ind.

[73] Assignee: P. R. Mallory & Co., Inc., Indianapolis, Ind.

[22] Filed: Nov. 27, 1974

[21] Appl. No.: 527,606

[52] U.S. Cl. ............................ 317/230; 29/570
[51] Int. Cl.² ................................ H01G 9/05
[58] Field of Search ................... 317/230; 29/570

[56] References Cited
UNITED STATES PATENTS

| | | | |
|---|---|---|---|
| 3,516,150 | 6/1970 | Leech | 317/230 X |
| 3,573,566 | 4/1971 | Fournier | 317/230 |
| 3,611,054 | 10/1971 | Piper et al. | 317/230 |
| 3,641,399 | 2/1972 | Klein et al. | 317/230 |
| 3,646,404 | 2/1972 | Matsuo et al. | 317/230 |

*Primary Examiner*—James B. Mullins
*Attorney, Agent, or Firm*—Hoffmann, Meyer & Hanson

[57] ABSTRACT

The disclosure relates to an electrical component with low impedance over a range of high frequency input signals. The electrical component comprises a dielectric film-forming metal anode with an anode lead projecting from the anode, electrolyte contacting the surfaces of the anode to form a body, and a cathode lead contacting the body and substantially parallel to the plane of the anode lead. Preferably, the length of the anode lead and the cathode lead are a minimum as well as is the distance between the anode lead and the cathode lead in order to help reduce the impedance of the electrical component over a range of high frequency input signals. Surfaces of the body are at an angle with respect to each other. The cathode lead includes an elongated strip of electrically conducting material projecting from the body and a surface of the strip is joined to one or more of the surfaces of the body at an angle with respect to each other. Preferably, the elongated strip of the cathode lead is joined to one of the surface of the body. An example of an electrical component body is a solid tantalum capacitor.

10 Claims, 5 Drawing Figures

U.S. Patent  July 27, 1976  3,971,970
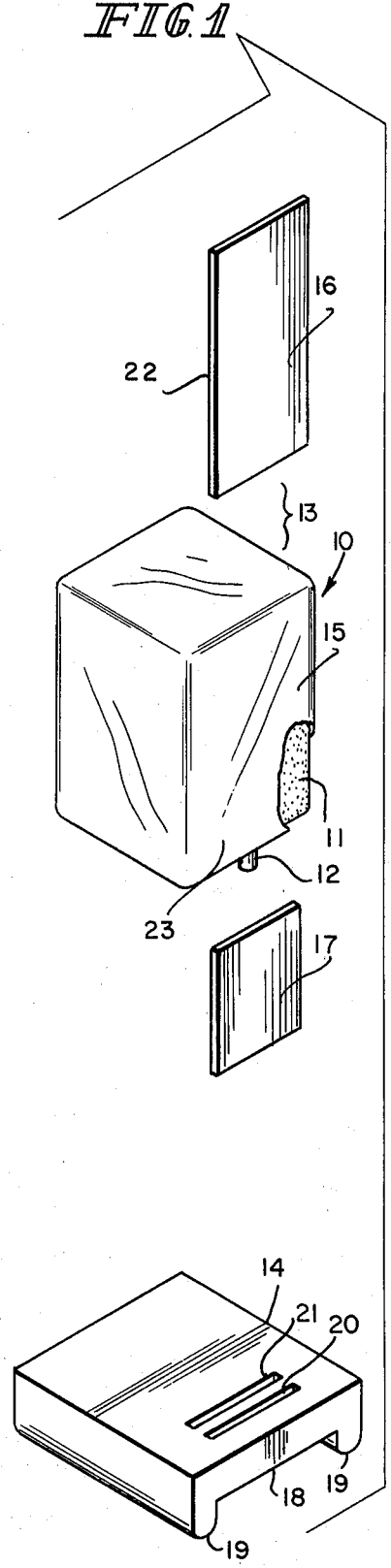
FIG. 1
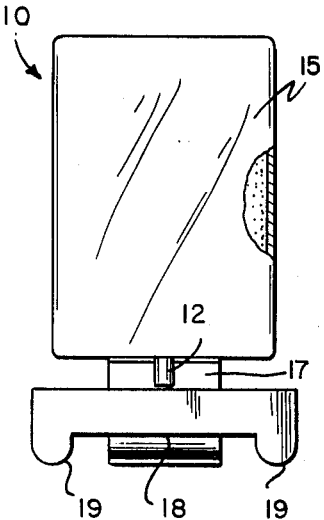
FIG. 2
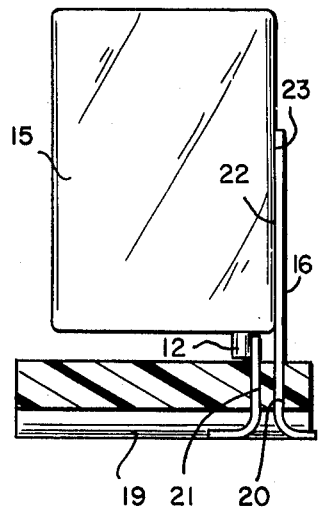
FIG. 3
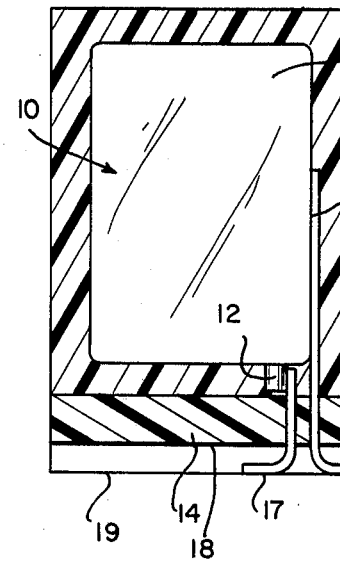
FIG. 4
FIG. 5

ELECTRICAL COMPONENT WITH LOW IMPEDANCE AT HIGH FREQUENCY

The present invention relates to an electrical component with a relatively low impedance at high frequency input signals, and, more particularly, to an electrical component having a cathode lead including an elongated strip of electrically conducting material projecting from the component with a surface of the elongated strip joined to one or more of the surfaces of a body of the component, surfaces of the body joined to the elongated strip of the cathode lead being at an angle with respect to each other. The elongated strip of the cathode lead helps to reduce high frequency impedance of the electrical component over an electrical component having a body with a wire-like cathode lead joined to a single surface of the body and aides in the fabrication of the electrical component. Preferably, the lengths of the cathode lead and an anode lead are a minimum and parallel to each other with a minimum of distance between the anode lead and the cathode lead to further help reduce the impedance of the electrical device over a range of high frequency input signals.

"Electrical component" as used herein means and includes all types of capacitors, resistors and inductors intended for use at high frequency. However, for the purpose of clarity and not for the purpose of limitation, the concepts of the present invention will be discussed in relation to a solid tantalum capacitor adapted for use at high input frequencies, that is, at frequencies up to and including 100 MHz or higher.

"Impedance" as used herein means and includes the opposition to electron flow when an alternating voltage is present.

"Solid tantalum capacitor" as used herein means and includes a capacitor having a tantalum anode with a solid electrolytic material.

The cathode of the electrical component includes a short length of an elongated strip of electrically conducting material projecting from the body of the component and with a surface joined to one or more of the surfaces of the body at an angle with respect to each other, and parallel to and separated by a small distance from the anode lead. The configuration of the cathode lead and its physical position with respect to the anode lead helps to reduce the impedance of a solid tantalum capacitor adapted for use at high frequencies and aides in the fabrication of the capacitor.

A conventional means of terminating a solid tantalum capacitor is to solder an elongated substantially straight axial or radial lead wire to the anode side of the capacitor body and to solder an elongated substantially straight axial or radial wire to the cathode side of the capacitor body. One of the elongated lead wires projects from the anode side of the capacitor and the other of the elongated wires projects from the cathode side of the capacitor. This form of termination of a capacitor body tends to have desirable impedance values at high operating frequencies, that is, an undesirable impedance value at input frequencies of 1 MHz or higher.

It has been found that the impedance value of capacitor is significantly reduced at high operating frequencies over an axial or radial lead wire type terminal configuration employed with a capacitor body by using a cathode lead contacting the cathode side of the electrical component body wherein the cathode lead includes a relatively short length of an elongated strip of electrically conducting material with a surface joined to one or more of the surfaces of the body at an angle with respect to each other. It has also been found that the impedance value of the capacitor at high input frequencies is further reduced, provided the anode riser has joined to it a relatively short length of an elongated strip, preferably, having substantially the same width as the elongated strip of the cathode lead and parallel to and separated by a small distance from the cathode strip.

A feature of the invention is to provide an electrical component having low impedance at high frequency input signals with a cathode lead including an elongated strip of electrically conducting material with a surface joined to one or more of the surfaces of the body at an angle with respect to each other. A further feature of the invention is to provide an electrical component body with a cathode lead including a short length of an elongated strip of electrically conducting material and an anode including a short length of an elongated strip of electrically conducting material with sustantially the same width dimension as the cathode stip and each of the elongated strips projecting a short distance from the electrical component body in substantially the same direction. A further feature of the present invention is to provide a cathode lead with an elongated strip having a surface joined to a surface or surfaces of the body of the electrical component and width and length dimensions forming an area equal to or greater than one-half the area of the surface or surfaces of the body to which the surface of the elongated strip of the cathode lead is joined.

Other features of the invention will become more apparent from the drawings, the following description and appended claims.

In the drawing:

FIG. 1 is an exploded, isometric view of the electrical component including a body, a cathode lead including an elongated cathode strip with a surface joined to one surface of the body, and an anode strip bonded to an anode riser projecting from the body;

FIG. 2 is a front elevational view of the electrical component of FIG. 1;

FIG. 3 is a side elevational view of the electrical component device of FIG. 1;

FIG. 4 is the electrical component means of FIG. 1 showing encapsulation of the electrical component means; and FIG. 5 is the electrical component means comprising a cathode lead including an elongated cathode strip with a surface joined to more than one surface of the body, and showing encapsulation of the electrical component means.

Referring now to FIGS. 1 through 5 of the drawing, an electrical component 10 includes an anode body 11 with an anode riser 12 projecting from the anode 11, a cathode 13 over the anode body 11, and, optionally, an electrically insulating base 14.

The cathode 13 includes cathode coating 15 joined to an elongated cathode strip 16. The cathode coating 15 is a suitable electrically conducting material such as metallic paint, solder or the like. The elongated cathode strip 16 is an electrically conducting and relatively rigid material such as nickel, solder coated nickel, copper, a copper base alloy, nickel coated with silver or the like. It is presently preferred that the elongated cathode strip 16 be nickel coated with silver. The relatively rigid characteristic of the elongated cathode strip 16 and the relatively large area of the strip joined to surface 23 of the cathode coating 15 provides a vibration and abusive handling resistant cathode connection, and a low contact resistance connection. As shown in FIGS. 3 and 4 of the drawing, surface 22 of the elongated strip 16 of the cathode 13 immediately adjacent surface 23 of the cathode coating 15 is intimately joined to the cathode coating 15 by any suitable means such as by soldering or the like to reduce electrical contact resistance between cathode coating and the cathode strip. The total length of the elongated strip 16 illustrated in FIGS. 1 through 4 does not appear to be critical to the operation of a capacitor at high input frequencies. However, the larger the area of the surface 22 of the elongated cathode strip 16 contacting the anode coating 15, the greater the mechanical support imparted to the capacitor by the elongated strip 16.

In FIG. 5 it should be noted that surfaces 22 of the elongated strip 16 are intimately joined to the surfaces 23 and 24 of the electrical component 10, and have width and length dimensions forming a surface area equal to or greater than one-half the area of the surfaces 23 and 24 of the component 10 to which the surface of the elongated strip 16 is joined. It should also be noted that the angle between an adjacent surface of the electrical component 10 joined to the surface of the elongated strip 16 of the cathode is about a 90° angle. The configuration of the elongated strip 16 illustrated in FIG. 5 appears to provide more resistance to the capacitor to the harmful effects of vibration, abusive handling and the like than does the elongated strip configuration illustrated in FIGS. 1 through 4. A capacitor with the elongated strip configuration 16 illustrated in FIG. 5 has little, if any, greater value at high frequency than a capacitor with the elongated strip configuration 16 illustrated in FIGS. 1 through 4.

As illustrated in the several FIGURES of the drawing, the electrical component 10 includes an anode body 11 and an anode riser 12 projecting from the anode body. The anode riser 12 may be joined to the anode body 11 by any suitable means such as by welding or by pressing the riser into the mass of metal powder used to form the anode body. The end of the anode riser 12 projecting from the component 10 provides electrical connection to the anode side of the electrical component 10. The anode body 11 and anode riser 12 are made of the same dielectric oxide film-forming metal. Suitable dielectric oxide film-forming metals are tantalum, aluminum, niobium and the like. The anode body 11 is made from suitably joined together metal powder and includes a myriad of intercommunicating voids (not shown). Surfaces of the anode body 11 are covered by a suitable dielectric (not shown) such as an oxide film of metal of the anode body. A suitable solid electrolyte (not shown), such as manganese dioxide, is over the dielectric oxide film. Preferably, the anode riser 12 has suitably attached thereto an elongated anode strip 17 of electrically conducting metal. Preferably, the elongated anode strip 17 has substantially the same width dimension as the elongated cathode strip 16 and projects in substantially the same direction from the anode body 11 as does the elongated cathode strip 16.

It is important (i) that the elongated cathode strip 16 and the elongated anode strip 17 project a distance from surface 18 of the base 14 in substantially spaced, parallel relationship; (ii) to minimize the length of each of the elongated strips 16 and 17 from the point of last intimate contact or engagement with the anode body 11 to the point where each of the elongated strips 16 and 17 projects beyond the standoff means 19 or if there is no standoff means 19 to the point where each of the strips project from the body 11; and (iii) to minimize the distance separating the elongated strip 16 from the elongated anode strip 17 if maximum benefit of minimum impedance value at high operating frequencies is to be realized.

Comparative data are given in Tables 1 and 2 to show the difference, and a significant difference in the impedance noted that the operating frequencies of one MHz and higher.

Impedance data at various input frequencies for a two-terminal wire lead capacitor is given in Table 1. Impedance data at various input frequencies are given at Table 2 for a two-terminal capacitor as shown in FIGS. 1 through 4 of the drawing. The two-terminal capacitor is similar to the two-terminal strip anode and cathode capacitor but for the strip anode and cathode connection. The anode of each capacitor is tantalum, the anodes having myriad of intercommunicating voids. The tantalum anode surface is substantially covered with a dielectric film of an oxide of tantalum. The electrolyte includes solid manganese dioxide, The electrolyte is covered with solder and the body is encapsulated in epoxy. The rating of each capacitor is about 50 $\mu$ F at 10 Vdc. The test circuit included a vector volt meter.

TABLE I

| Frequency | 1MHz | 10MHz | 100MHz |
| --- | --- | --- | --- |
| Impedance (ohms) | 0.08 | 0.3 | 4 |

TABLE II

| Frequency | 1MHz | 10MHz | 100MHz |
| --- | --- | --- | --- |
| Impedance (ohms) | 0.06 | 0.08 | 1.3 |

At the lower input frequencies, there does not appear to be a substantial difference between the impedance value of the standard two-terminal device and the impedance value of the strip terminal configuration of the present invention. A difference in the impedance value is evident at input frequencies of 1MHz and a significant difference in impedance value is noted at input frequencies of 10MHz and higher.

The base 14 shown in several Figures of the drawing may be formed from any suitable electrically insulating, substantially rigid material such as BAKELITE plastic, plastic, nylon or the like. A presently preferred material for the base 14 is nylon. Preferably, the material of the base 14 is compatible with the material to be employed for encapsulating the electrical component 10.

The base 14 has two elongated rectangular shaped apertures 20 and 21 formed therein, and two elongated standoff means 19 extending from the surface 18 of the base. The elongated apertures 20 and 21 formed in the base 14 are used to receive leads 16 and 17 projecting from the body 11. A function of the elongated standoff means 19 is to provide the base 14 with a suitable foundation that is firm when engaged with a mounting means (not shown) such as a mounting panel. Variations of the configuration of the standoff means 19 may be used to identify the electrical polarity of the terminal means of the electrical component 10. Alternatively, polarity identification of the terminal means of the electrical component device may be provided by suitable characteristics (not shown) formed in the base 14.

The elongated cathode strip 16 and the elongated anode strip 17 are inserted into apertures 20 and 21 of the base 14 by aligning the extremities of each of the strips 16 and 17 with the apertures and moving the anode body 11 into spaced relationship with respect to the base 14 so that the extremities of each of the elongated strips 16 and 17 project through the apertures 20 and 21 and beyond the standoff means 19 associated with the base 14 a suitable distance. Each of the elongated strips 16 and 17 are suitably joined to the base 14 by encapsulating the anode body 11 in a manner described hereinafter. The cross-sectional dimensions of the elongated cathode strip and the elongated anode strip 17 in relation to the cross-sectional dimensions of the apertures of the base 14 are such that manual or machine insertion of the strips 16 and 17 into the apertures of the base 14 may be readily accomplished.

Having provided the electrical component body 11 in cooperative association with the base 14, the electrical component 10 may be suitably encapsulated. FIG. 4 shows one form used to encapsulate the electrical component 10. Encapsulant 25, a suitable electrically insulating resinous material such as a thermoplastic or thermosetting material, is formed over the body 11 so as to substantially completely encapsulate the body 11 and join the base 14 to the insulating resinous encapsulant 22. One method of encapsulating the body 11 is to place the body 11 in cooperative association with base 14 in a suitable mold cavity (not shown). The body 11 is supported in the mold cavity by the base 14 and the standoffs 16. Suitable thermoplastic or thermosetting resinous material compatible with the material of the base 14 and the body 11 is injected into the mold to substantially cover the body 11. Preferably, the material used to form the encapsulant 25 and the material of the base 14 are the same. Suitable thermoplastic materials for injection molding that are compatible with the materials of the solid type capacitor body include polypropylene, polystyrene, polycarbonate and urethane resins. It is possible to use epoxy, diallyl phthalates, phenolic or other thermosetting resins capable of molding in which do not harmfully effect the electrical component body 10.

Another form (not shown) of encapsulating the electrical component 10 is achieved by immersing or dipping the body 11 in a liquid bath (not shown) of electrically insulating resinous material such as thermpolastic or thermosetting resins of the type given above so as to provide an encapsulant 25 of such resin.

An electrical component 10 having added protection against abusive handling is shown in FIG. 5. Body 11 is inserted into sleeve 26 of MYLAR. The inside diameter of the sleeve 26 is slightly greater than the outside diameter of the body 11. Void volumes between the inner wall of the sleeve 26 and the body 11 are filled with a suitable potting or filler material 27. The potting material or filler material 27 may include length as suitable dielectric filler reinforcement (not shown). A suitable dielectric fiber reinforcement includes mineral fibers such as glass, asbestos, calcium carbonate, inorganic fillers such as macerated nylon.

The embodiment shown in FIGS. 4 and 5 ideally include at least the outer periphery of the surface of the base 14 covered by encapsulant 25. Ideally, encapsulant 25 has moved into the apertures 20 and 21 to fill each.

It should be understood that many widely different embodiments of this invention may be made without departing from the spirit and scope thereof, it is to be understood that the invention is not limited to specific embodiments hereof, except as applied in the appended claims.

We claim:

1. An electrical component having low impedance at high frequency input signals comprising a dielectric oxide film-forming metal anode with an anode lead projecting from the anode, electrolyte contacting surfaces of the anode to form a body, surfaces of the body at an angle with respect to each other, and a cathode lead contacting the body, the cathode lead including an elongated cathode strip having at least two major surfaces, one of the major surfaces bonded to at least one of the surfaces of the body, the anode lead and the cathode strip spaced a short distance from each other and each projecting from the body a relatively short distance in a spaced, substantially parallel relationship.

2. The electrical component of claim 1, wherein the angle between adjacent surfaces of the body bonded to the surface of the elongated cathode strip is about a 90° angle.

3. The electrical component of claim 1, wherein the body has a shape of a hexahedron of six rectangles.

4. The electrical component of claim 1, wherein the anode lead includes an elongated anode strip having substantially the same width dimension as the elongated cathode strip.

5. The electrical component of claim 4, wherein the joined surfaces of the elongated anode strip and the elongated cathode strip are substantially flat.

6. The electrical component of claim 1, wherein the surface of the elongated cathode strip is bonded to at least one substantially flat surface of the body.

7. The electrical component of claim 1, wherein the surface of the elongated cathode strip joined to at least one surface of the body has width and length dimensions forming an area equal to or greater than one-half of the area of the surfaces of the body to which the surface of the elongated cathode strip is joined.

8. The electrical component of claim 7, wherein the width dimension of the surface of strip of the cathode lead is equal to or greater than one-half the width dimension of the surface or surfaces of the body to which the surface of the cathode strip is joined.

9. A capacitor including the electrical component of claim 1, wherein the anode includes a myriad of intercommunicating voids, a dielectric oxide film of the metal of the anode contacting surfaces of the anode, and the electrolyte is a substantially solid material contacting the dielectric oxide film.

10. The capacitors of claim 9, wherein the capacitor is a solid tantalum capacitor.

* * * * *

UNITED STATES PATENT OFFICE
CERTIFICATE OF CORRECTION

PATENT NO. : 3,971,970
DATED : July 27, 1976
INVENTOR(S) : Gerald A. Voyles & Edward M. Moss It is certified that error appears in the above—identified patent and that said Letters Patent are hereby corrected as shown below:

Col. 1, line 59, delete "desirable" and insert ---undesirable---.

Col. 2, line 23, delete "sustantially" and insert ---substantially---.

Col. 2, line 24, delete "stip" and insert ---strip---.

Col. 4, line 25, delete comma after "dioxide" and insert period after "dioxide".

Col. 5, line 18, after "strip" insert ---16---.

Col. 5, line 52, delete "thermpolastic" and insert ---thermoplastic---.

Signed and Sealed this

Fifth Day of October 1976

[SEAL]

Attest:

RUTH C. MASON
*Attesting Officer*

C. MARSHALL DANN
*Commissioner of Patents and Trademarks*